Jan. 8, 1952 — P. N. ELLIOTT — 2,581,845
METHOD OF FORMING FIN VIBRATION DAMPER
Filed Oct. 2, 1948

Inventor
Phillip N. Elliott
by Charles R. Shelton
Attorney

UNITED STATES PATENT OFFICE 2,581,845

METHOD OF FORMING FIN VIBRATION DAMPER

Phillip N. Elliott, Manchester, Conn., assignor to United Aircraft Corporation, East Hartford, Conn., a corporation of Delaware Application October 2, 1948, Serial No. 52,581

3 Claims. (Cl. 18—59)

This invention relates to a method of forming a vibration damper for a finned structure, particularly for the cooling fin structure of a cylinder for an air-cooled internal combustion engine. However, the method herein described is not limited to a cooling fin structure, but is applicable to any finned structure in which there is a problem of fin dampening.

The primary object of this invention is to provide a damper which can be applied to the fins in the form of a paste or plastic, such as a silicone rubber compound, and then cured to adhere to the surface of the fins. This has the advantage that it can be used on fins having complex shapes and contours where it would be extremely difficult or impossible to apply preformed braces or damper pads of the type known in the prior art.

A further object is to provide a fin damper which is light in weight and which will not damage the fins as sometimes occurs where metal dampers are used.

Still another object is to provide a damper which can easily be repaired, as by patching, and which does not require careful or special machining of the fins.

Figure 1:
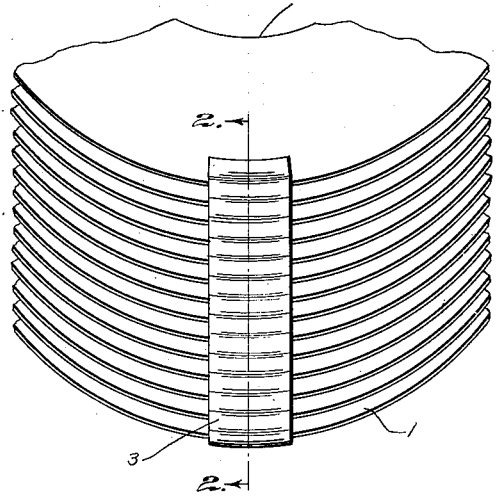
Figure 2:
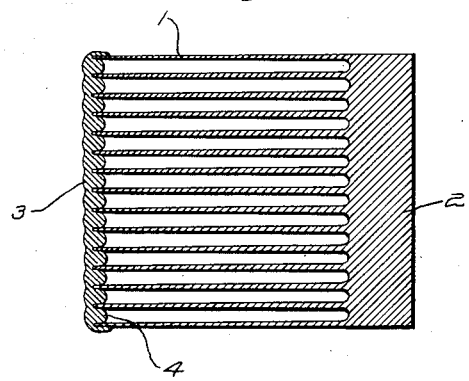

Other objects of this invention will become apparent and the invention will be better understood from the following description in connection with the drawings in which:

Fig. 1 is a perspective view of a finned body with the invention applied thereto, and Fig. 2 is a section taken on the line 2—2 showing the finned body and the final form of the fin damper.

The preferred embodiment of the invention is disclosed in the drawings in which the reference numeral 2 indicates a body, such, for example, as the wall of a cylinder of an air-cooled internal combustion engine, having a series of spaced cooling fins, extending outwardly therefrom. It has been found in practice that a certain engine speeds sympathetic vibrations are set up in the cooling fins which may at times cause them to crack and fail. It is therefore desirable to provide some means to dampen such vibrations and hence increase the life of the engine and the safety of its operation. To this end the damper 3 is applied to the fins as shown in Figs. 1 and 2.

The drawings show the fin damper 3 in position in its final form on the fins 1 of engine cylinder 2. These fin dampers are formed of a proper curable compound, such as a silicone rubber compound, this same compound with asbestos fibre added to increase its resistance to heat, or a phenolic resin-thiokol rubber dispersion compound. The selection of a compound for use as a fin damper may be determined by the temperatures to which it is to be subjected. For example, for the fins of a cylinder of an internal combustion engine, a silicone rubber compound is used, as it can withstand the high temperatures reached by the fins. For a finned body not subjected to such high temperatures the phenolic resin-thiokol rubber dispersion compound can be used. In cases where extremely high temperatures are reached, asbestos fibres may be added to the compound to increase its resistance to heat, as mentioned before. The compound to be used can be applied in several different ways, all coming within the scope of this invention.

First, this compound can be spread down a line in the form of a paste, using a blade or trowel, connecting the fins (as shown in the figures), upon which a damper pad is desired. To obtain an even sided finished damper pad using this paste, two strips of masking tape are laid down on the outer surfaces of the fins allowing for the width of damper pad desired, and then the paste is spread down between the strips of tape. When the tape is lifted it leaves the damper pad with straight, even sides. However, this is merely to improve the appearance of the damper pad and the pad may be formed with uneven sides, if desired, without affecting its performance.

Second, a pre-formed strip of such a material can be prepared, either uncured or partially cured, and then pressed into place as shown in Figs. 1 and 2. When this strip of prepared material is used, it can be reinforced with a tape applied either to the back side of the strip or sandwiched between two layers of the material. Instead of being pressed into the fins, the strip form can be rolled on with a roller. This leaves a cross-section similar to the one as shown in Fig. 2, noting inwardly bulging portions 4. This strip can be pressed or rolled to any desired thickness. If a large bonding area between the material and fins is desired the pad can be applied so as to increase the depth to which it extends between the fins.

Next the damper must be properly cured. This is accomplished by heating the fins and the damper strip to the proper temperature and for a time necessary to cause the damper strip to adhere or become bonded to the metal fins. It has been found that the curing time or cycle for the final curing step varies with the compound used and the form of the compound, that is, whether it is a paste or a partially cured strip. Generally, paste type compounds require cycles starting at 100° F. and increasing gradually to 500° F. or 550° F. over a period of 8-10 hours, while compounds suitable for applying in strip form may only require a short-term cure of as little as 2 hours at 300° F. In both forms, paste or strip, the composition or material becomes resilient when cured and is also firmly bonded or adhered to the fins. The final curing step may be accomplished by the heat developed in the finned body itself. For an example, a damper pad can be applied to the fins of a cylinder of an internal combustion engine by one of the methods described above, and cured by the heat developed during the operation of the engine.

I claim:

1. The method of forming a fin damper on a series of fins on a finned body to dampen vibrations thereof which comprises placing a strip of a curable rubber compound in a plastic state onto said fins, regulating the distance the portion of the strip between the fins extends from the edges of said fins towards the body to prevent complete filling of the spaces between the fins, and curing said strip until it becomes resilient and adhered to said fins.

2. The method of forming a fin damper on a series of fins on a finned body to dampen vibrations thereof which comprises placing a strip of a curable rubber compound in a plastic state against the edge of a series of fins, working said strip onto said fins, regulating the distance the portion of the strip between the fins extends from the edges of said fins towards the body to prevent complete filling of the spaces between the fins, and curing said strip until it becomes resilient and adhered to said fins.

3. The method of forming a fin damper on a finned body to dampen vibrations thereof which comprises placing a rubber compound in a plastic state against the edge of a series of fins, working said compound onto said fins, regulating the distance the portion of the compound between the fins extends from the edges of said fins towards the body to prevent complete filling of the spaces between the fins and curing said compound until it becomes resilient and adhered to said fins.

PHILLIP N. ELLIOTT.

REFERENCES CITED

The following references are of record in the file of this patent:

UNITED STATES PATENTS

| Number | Name | Date |
|---|---|---|
| 817,993 | Rueter | Apr. 17, 1906 |
| 1,578,793 | Apple | Mar. 30, 1926 |
| 1,739,246 | Majce | Dec. 10, 1929 |
| 1,913,328 | Bollman | June 6, 1933 |
| 2,218,351 | Crowell | Oct. 15, 1940 |
| 2,253,025 | Fedden et al. | Aug. 19, 1941 |
| 2,351,329 | Gerstenmaier | June 13, 1944 |
| 2,455,708 | Sherwin | Dec. 7, 1948 |

FOREIGN PATENTS

| Number | Country | Date |
|---|---|---|
| 462,615 | Great Britain | Mar. 12, 1937 |